(12) United States Patent
Haverinen et al.

(10) Patent No.: US 7,096,014 B2
(45) Date of Patent: Aug. 22, 2006

(54) ROAMING ARRANGEMENT

(75) Inventors: Henry Haverinen, Tampere (FI); Kalle Ahmavaara, Helsinki (FI)

(73) Assignee: Nokia Corporation, Espoo (FI)

( * ) Notice: Subject to any disclaimer, the term of this patent is extended or adjusted under 35 U.S.C. 154(b) by 320 days.

(21) Appl. No.: 10/281,072

(22) Filed: Oct. 24, 2002

(65) Prior Publication Data
US 2003/0119481 A1 Jun. 26, 2003

(30) Foreign Application Priority Data
Oct. 26, 2001 (EP) ........................ PCT/EP01/12455
Jan. 11, 2002 (FI) ................................ 20020057

(51) Int. Cl.
H04Q 7/20 (2006.01)

(52) U.S. Cl. ................ 455/432.1; 455/433; 455/435.1; 455/435.2; 455/435.3; 455/558

(58) Field of Classification Search ............. 455/432.1, 455/433, 435.1, 435.2, 435.3, 558, 410, 411, 455/406, 407, 408
See application file for complete search history.

(56) References Cited

U.S. PATENT DOCUMENTS

| | | | | |
|---|---|---|---|---|
| 5,839,069 A * | 11/1998 | Keshavachar et al. | ...... | 455/437 |
| 5,953,673 A * | 9/1999 | Neubauer et al. | ........... | 455/518 |
| 6,067,529 A * | 5/2000 | Ray et al. | ..................... | 705/26 |
| 6,185,436 B1 * | 2/2001 | Vu | .............................. | 455/558 |
| 6,387,027 B1 * | 5/2002 | Bodin | ........................ | 455/419 |
| 6,456,857 B1 * | 9/2002 | Bos et al. | ................. | 455/550.1 |
| 6,463,286 B1 * | 10/2002 | Salminen | ..................... | 455/453 |
| 6,496,689 B1 * | 12/2002 | Keller et al. | ................ | 455/406 |
| 6,529,732 B1 * | 3/2003 | Vainiomaki et al. | ........ | 455/433 |
| 6,728,215 B1 * | 4/2004 | Alperovich et al. | ........ | 370/252 |
| 6,741,868 B1 * | 5/2004 | Park et al. | ............... | 455/552.1 |
| 6,826,414 B1 * | 11/2004 | Reynolds et al. | ........... | 455/555 |
| 6,950,419 B1 * | 9/2005 | Park et al. | ................... | 370/338 |
| 2001/0003094 A1 * | 6/2001 | Foll | ........................... | 455/466 |
| 2001/0024953 A1 | 9/2001 | Balogh | | |
| 2001/0028641 A1 * | 10/2001 | Becher et al. | ............... | 370/352 |
| 2002/0068574 A1 * | 6/2002 | Vestergaard et al. | ........ | 455/445 |
| 2003/0045241 A1 * | 3/2003 | Noerpel et al. | ............ | 455/67.1 |

(Continued)

FOREIGN PATENT DOCUMENTS

WO     WO 00/79814 A1    12/2000

(Continued)

OTHER PUBLICATIONS

J. Ala-Laurila, J. Mikkonen and J. Rinnemaa, "Wireless LAN Access Network Architecture for Mobile Operators". IEEE Communications Magazine, Nov. 2001, pp. 82-89.

(Continued)

Primary Examiner—George Eng
Assistant Examiner—Huy Phan
(74) Attorney, Agent, or Firm—Hollingsworth & Funk, LLC

(57) ABSTRACT

The invention relates to a method of arranging roaming in a telecommunications system comprising a local network, at least one public land mobile network, and a terminal equipment. In the telecommunications system, public land mobile network identifiers and network element identifiers linked therewith are defined. These public land mobile network identifiers and the network element identifiers linked therewith are transmitted to the terminal equipment. The terminal equipment selects a public land mobile network by means of a comparison of the received public land mobile network identifiers and public land mobile network identifiers stored in the terminal equipment. Access is arranged for the terminal equipment via the local network to the network element determined by the network element identifier linked with the identifier of the selected public land mobile network.

23 Claims, 3 Drawing Sheets

U.S. PATENT DOCUMENTS

2003/0045290 A1* 3/2003 Tuohimetsa et al. ........ 455/435
2003/0051041 A1* 3/2003 Kalavade et al. ........... 709/229
2005/0117540 A1* 6/2005 Kuchibhotla et al. ....... 370/329

FOREIGN PATENT DOCUMENTS

WO  WO 01/95657 A2  12/2001
WO  WO 01/95657 A3  12/2001

OTHER PUBLICATIONS

T. Bostrom, T. Goldbeck-Lowe, and R. Keller, "Ericsson Mobile Operator WLAN Solution", Ericsson Review No. 1, 2002. pp. 36-43.

J. Arkko and H. Haverinen, *EAP AKA Authentication* Oct. 2001.

* cited by examiner

ROAMING ARRANGEMENT

BACKGROUND OF THE INVENTION

The invention relates to arranging roaming in a telecommunications system comprising a wireless local access network and a public land mobile network (PLMN).

There has been considerable development in recent years in data services provided for mobility-enhancing PLMNs with large coverage areas. The general packet radio service (GPRS) provides GSM networks with efficient data transmission, where radio capacity is only reserved during transfer of packets. A 3G universal mobile telecommunications system (UMTS), standardized by 3GPP (Third Generation Partnership Project), will provide even higher data transmission capacity than GSM/GPRS networks. A radio interface provided by a UMTS terrestrial radio access network (UTRAN) is based on enhanced WCDMA (Wideband Code Division Multiple Access) technology, and a core network is based on the GSM/GPRS core network.

In addition to data services provided by PLMNs, various wireless local area networks have been developed to provide wideband wireless data transmission from a very limited coverage area. An example of such technology is a wireless local area network (WLAN) based on IEEE 802.11. These local networks provide high-speed data transmission and access to the Internet in different hot spots, such as offices or airports. There has also been some convergence of local area networks and PLMNs. For example GSM-based base stations can be used in an office data system to provide a wireless connection to the local area network of the office. On the other hand, WLANs have also been provided with network elements, with which the WLAN can utilize a PLMN. For example WLANs according to the IEEE 802.11 standard, and GSM networks have been provided with network elements for accessing GSM authentication and billing services via a WLAN.

Roaming can also be arranged in a WLAN, i.e. a user can be authenticated in the local network where he is roaming (and with which he typically has no service contract made in advance) by means of the PLMN, a subscriber identification module (in the GSM a subscriber identity module SIM) provided by the home PLMN (HPLMN), and subscriber data located in the subscriber's home network. However, a mobile station can also be located for example abroad in the area of a local network with no direct connection to the subscriber's HPLMN but only to one or more networks of other PLMN operators. In order to provide successful roaming in such a situation, PLMN operators must have mutual roaming agreements determining how a roaming subscriber is to be charged. When a roaming mobile station contacts a local network, it is not necessarily aware of the PLMNs that are available via the local network in question. In such a case, the mobile station must provide the local network with the network identifier (PLMN ID) of its HPLMN operator. Based thereon, the local network should select the PLMN that the roaming user should use. For this purpose, the local network should store data about the PLMNs where the user can roam, and preferably also data on the preferred PLMNs. This would require additional functionality and increase the need for memory capacity in the local network, and it might also cause conflicts of interest between the PLMN operators and the operators of local area networks.

BRIEF DESCRIPTION OF THE INVENTION

An objective of the invention is to provide an improved arrangement for implementing roaming in local networks, which provide access to PLMNs. The objectives of the invention are achieved by a method, a telecommunications system and a wireless terminal equipment which are characterized by what is disclosed in the independent claims. The preferred embodiments of the invention are disclosed in the dependent claims.

According to the basic idea of the invention, PLMN identifiers and network element identifiers linked therewith are determined in a system and transmitted to a terminal equipment. PLMN selection is performed by means of a comparison of the received PLMN identifiers and PLMN identifiers stored in the terminal equipment. The terminal equipment is provided access, via a local network, to a network element defined by a network element identifier linked with the identifier of the selected PLMN.

A local network is typically either a wireless local area network (WLAN) or a wired local area network (LAN) operating on a non-licensed frequency range, but the scope of application of the invention is not restricted thereto, however.

An advantage of the arrangement according to the invention is that the network can be selected in the mobile station according to the preferences set by the user and/or the HPLMN operator. Therefore, the local network does not require data about roaming agreements between different PLMN operators, nor is it necessary to provide local networks with functionality implementing network selection. Thus, the interests of users, local network operators and PLMN operators can be satisfied through network selection carried out by the mobile station, and by using the PLMN identifiers the mobile station contains. The mobile station can utilize arrangements that are similar to the network selection methods used in existing PLMNs.

According to a preferred embodiment of the invention, a PLMN network element indicated by an identifier is an authentication server. The authentication server defined by the network element identifier linked with the identifier of the selected PLMN thus performs the authentication between each user and the PLMN. Data transmission services can be provided in a local network and/or a PLMN where the mobile station is roaming if successful authentication has taken place between the mobile station and the selected PLMN. Therefore highly functional and highly reliable PLMN authentication methods can also be applied on roaming users in local networks. A user does not necessarily have to have a subscription with a local network operator, but he may also be able to use local network services by means of a subscriber identification module provided by the UMTS operator, for example. According to another embodiment, billing data about the telecommunication services the mobile station has used is transmitted from the local network to the PLMN billing system, provided that the mobile station has been successfully authenticated. The roaming mobile station can thus also be charged via the HPLMN operator.

BRIEF DESCRIPTION OF THE FIGURES

The invention will be described in more detail below in connection with the preferred embodiments and with reference to the accompanying drawings, in which.

DETAILED DESCRIPTION OF A PREFERRED EMBODIMENT OF THE INVENTION

Figure 1A:
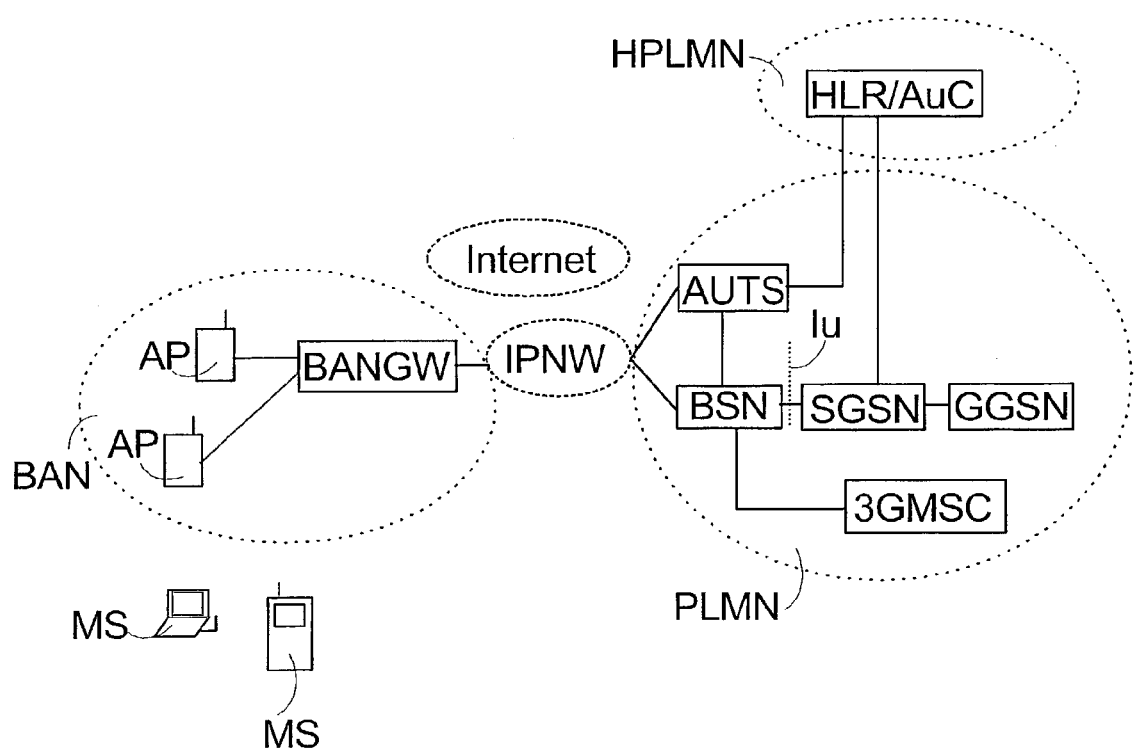
FIG. 1a shows a telecommunications system comprising a PLMN and a local network.

Reference is made to FIG. 1a, which illustrates a network architecture according to a preferred embodiment comprising a public land mobile network PLMN, or in this case a UMTS network, and a local network, in FIG. 1a a broadband access network BAN. According to a preferred embodiment, the local network BAN is a wireless local area network employing user authentication and access control according to IEEE 802.1x standard, for example a WLAN according to IEEE 802.11i. However, the invention can also be applied in other IEEE 802-based WLANs or other types of local networks BAN typically operating on a non-licensed frequency band, such as a broadband radio access network (BRAN) or a Bluetooth network. BRAN standards include type 1 and type 2 HIPERLAN (High Performance Radio Local Area Network) standards, and HIPERACCESS and HIPERLINK standards. A public land mobile network can be for example a GSM/GPRS network instead of a UMTS network.

The local network BAN and the UMTS network PLMN can communicate over an IP-based (Internet Protocol) network (IPNW). The UMTS network PLMN can comprise a UMTS terrestrial radio access network UTRAN and/or a UMTS core network CN, or at least some functionalities thereof. As shown in FIG. 1a, the local network BAN can operate as one of UMTS access networks, and it can also provide access to other networks, such as the public Internet. The BAN comprises access elements called access points AP, which provide a mobile station MS with radio access and thus terminate the broadband radio connection.

The access point AP controls the L2 radio interface according to the applied radio technology, which means the IEEE 802.11 standard according to a preferred embodiment. The IEEE 802.11 specifications determine both physical level and MAC level protocols for data transmission over the radio interface. The data transmission can utilize either infrared or two spread spectrum techniques (Direct Sequence Spread Spectrum DSSS, Frequency Hopped Spread Spectrum FHSS). Both spread spectrum techniques utilize a 2.4 GHz band. The MAC layer utilizes a CSMA/CA (Carrier Sense Multiple Access with Collision Avoidance) technique. The AP also manages bridging of data streams at the radio interface or routing thereof to and from other network nodes.

As shown in FIG. 1a, the local network BAN also comprises a control element or a gateway element BANGW (BAN Gateway). The BANGW operates as a gateway in data transmission between the AP and the UMTS network PLMN. These functions can be carried out in one or more logical or physical nodes, which can also be referred to by some other name than the BAN gateway, for example an access controller. The BANGW also allocates IP addresses to the mobile station MS and stores and delivers network information related to the UMTS network PLMN to the mobile stations MS requiring such information. The BANGW also receives and stores data about other networks that can be accessed via the BANGW, at least about the UMTS network PLMN. The BANGW forms charging information based on the data to be transmitted, and forwards it to the billing server for example according to an AAA (Authentication, Authorization and Accounting) protocol.

According to an alternative embodiment, either all or some of the BANGW functionality can be implemented in an access point AP. For example, an AP supporting user authentication and access monitoring according to IEEE 802.1x standard typically utilizes the AAA protocol and can thus communicate directly with authentication and accounting servers and also form the charging information based on the amount of transferred data or durations of connections.

The UMTS core network CN comprises a serving GPRS support node SGSN serving the mobile stations connected to the UMTS network, and a gateway GPRS support node GGSN, which provides a gateway function to external networks, such as the Internet or a company intranet. The PLMN can also comprise a mobile services switching centre 3GMSC providing circuit-switched services, and other network elements, such as a short message service centre SMSC and elements of the UMTS charging system, which are not shown in FIG. 1a.

The UMTS network PLMN comprises an authentication server AUTS, which provides local networks BAN with services for authenticating UMTS mobile subscribers and preferably also with charging services. Therefore UMTS network subscriber data and authentication services can be used to serve mobile stations MS roaming in the local network BAN and comprising a universal subscriber identity module USIM. A mobile station MS user does not necessarily have to have a contract made in advance with the local network BAN operator. In such a case an MS can be charged for the wireless connection provided by the local network BAN later on via the PLMN. The UMTS network PLMN operator can later reimburse the BAN operator for the use of the network. Even though the authentication server is shown as a separate element in FIG. 1a, it can be implemented for example as a part of a service node BSN, the SGSN or the GGSN.

If the PLMN is not the home network HPLMN of the mobile station MS, i.e. the mobile station is roaming in the PLMN, the roamed network must communicate with the HPLMN according to an international mobile subscriber identity IMSI indicated by a universal subscriber identity module USIM of the mobile station MS for purposes of authentication and charging. The HPLMN comprises a home location register HLR containing the subscriber data, and typically also an authentication centre AuC calculating authentication vectors. FIG. 1a does not show any other HPLMN elements, such as the 3GMSC or the SGSN, via which the connection to the HLR/AuC is typically set up. The UMTS specifications also refer to the roamed network as a serving network (SN) and to the HPLMN as merely a home network (HN).

Figure 1B:
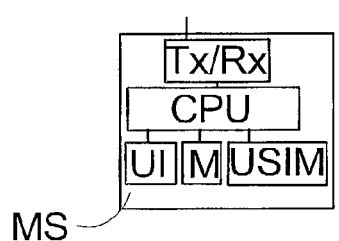
FIG. 1b illustrates the structure of a mobile station.
Figure 2:
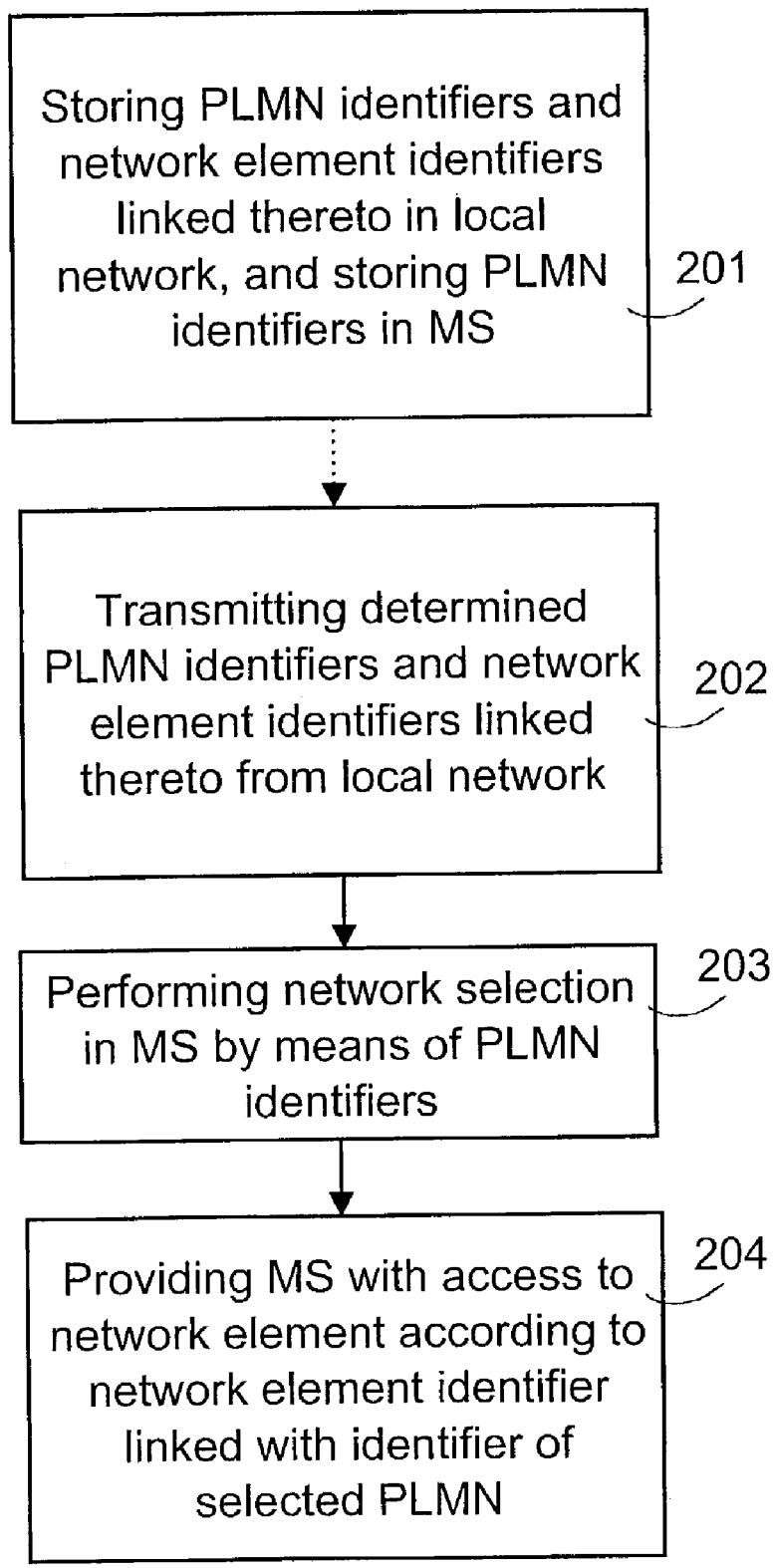
FIG. 2 is a flowchart illustrating a method according to a preferred embodiment of the invention.
Figure 3:
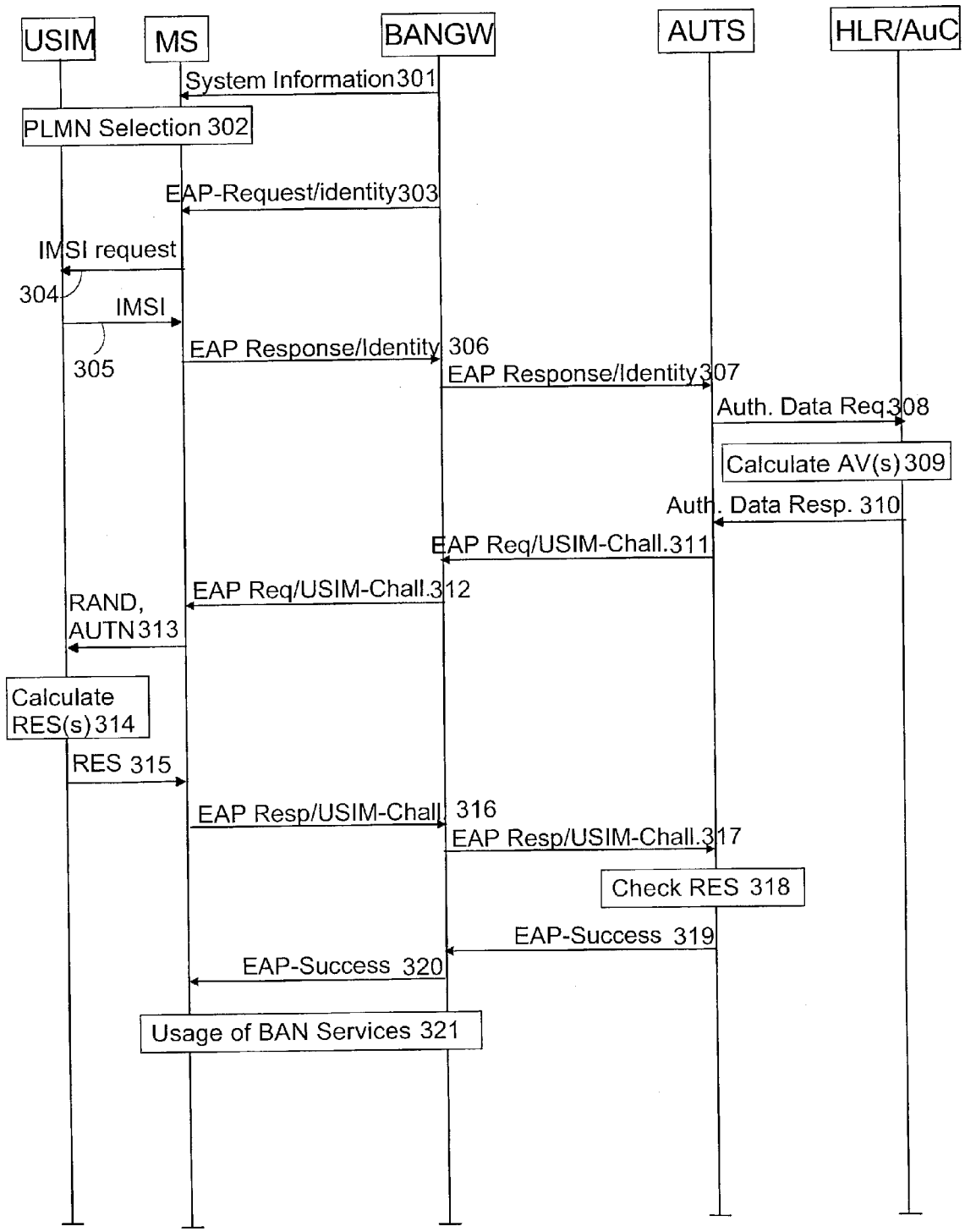
FIG. 3 is a signalling chart illustrating an authentication process according to a preferred embodiment of the invention.

As shown in FIG. 1b, the mobile station MS comprises a memory M, a user interface UI, a transceiver TxRx for implementing wireless data transmission, and a central processing unit CPU comprising one or more processors. The memory M comprises a non-volatile section for storing applications controlling the CPU and other data to be maintained, and a volatile section for temporary data processing. Computer program codes executed in the CPU can be used to make the MS implement the means according to the invention, some embodiments of which are illustrated in FIGS. 2 and 3. A computer program can be stored on any memory means, such as a PC hard disk or a CD-ROM, from which it can be loaded into the memory M of the MS executing the program. A computer program can also be loaded via the network for example by means of a TCP/IP protocol stack. It is also possible to use hardware arrangements or a combination of hardware and software to implement the means according to the invention. The MS can be for example an integrated communication device, a laptop computer combined with equipment providing radio access (e.g. a WLAN card), or a combination of a PDA and a mobile phone.

A mobile station MS according to a preferred embodiment comprises a UMTS-specific universal subscriber identity module USIM. The identity module used in the MS can be different in different mobile networks, for example GSM networks apply subscriber identity modules (SIM). By means of card-reading elements comprised by the MS (not shown in the figures), the CPU can utilize a universal integrated circuit card (UICC), including the USIM, according to the 3GPP specifications. A UICC can be changed from one MS to another. A USIM has been given by the HPLMN operator, and the HLR of the home network HPLMN stores data on the USIM. The USIM contains an international mobile subscriber identifier IMSI, which represents the subscriber in the network and thus operates as identification for the MS user. The terminal equipment TE part of the MS can also be provided with a specific international mobile equipment identity IMEI, which is not relevant for the invention, however. The USIM also contains a secret key K, an algorithm for forming a cipher key CK, an algorithm for verifying an authentication response AUTN transmitted from the PLMN, and an algorithm for forming a reference authentication response RES (if the AUTN has been verified).

According to a preferred embodiment, data transmission services of the UMTS network PLMN can be used via the local network BAN. In such a case the UMTS network comprises, besides the known UMTS access network elements, a broadband service node BSN for one or more local networks BAN. In this embodiment, after successful authentication (carried out by the authentication server AUTS) the MS can also use the services of the roamed UMTS network PLMN (either via the local network BAN and the service node BSN or directly via a node B and a radio network controller RNC). In many respects the operation of a BSN corresponds to the operation of an RNC. However, a BSN cannot be arranged to control the radio resources of the local network, and therefore a conventional Iub interface is replaced with an I4 interface to the local network BAN, so that the BSN communicates with the MS via the local network BAN. BSN functions include:

- executing RRC (Radio Resource Control) signalling protocols defined for the UTRAN possibly according to BAN-specific restrictions
- multiplexing higher-layer UMTS data streams, such as logic channels or transport channels, to IP-based transmission paths (e.g. a UDP/IP tunnel) to the BAN, and demultiplexing from the BAN
- managing radio connections
- providing UMTS encryption
- compressing UMTS IP headers
- UMTS RLC-level (Radio Link Control) retransmissions.

The functions of the BSN can possibly also comprise monitoring of the use of the local network BAN resources in order to check the charging of the BAN operator. The local network BAN can be shared by several UMTS networks. The local network BAN can also be connected to several BSNs, and a BSN can be connected to one or more local networks BAN. A BSN can be divided into different user plane and control plane server and gateway functions. A BSN can be connected to an SGSN, a mobile switching centre MSC and possibly to other UMTS core network elements via a standard Iu interface. A BSN can also be connected to other BSNs or UTRAN RNCs via Iur signalling interfaces in order to support handover inside a UTRAN or between UTRANs.

In an embodiment where a mobile station MS can utilize UMTS data transmission services, the MS supports at least some of the protocol entities required for communicating with the UMTS network PLMN. The MS contains means for implementing lower layers (L1, L2) of the local network BAN, and means for communicating with the UMTS network via the local network. In this embodiment, the MS also comprises the following functions:

- executing UMTS higher-layer signalling protocols determined in the 3GPP specifications. Such protocols include RRC (Radio Resource Control), session management and mobility management.
- implementing limited functionality of UMTS user plane protocols, and communicating user plane data with the BSN in view of possible limitations resulting from the local network BAN. Such protocols include RLC (Radio Link Control) and PDCP (Packet Data Control Protocol).
- multiplexing higher-layer UMTS data streams to the UDP/IP-based communication of the lower layers, and inversely de-multiplexing the received data into UMTS data streams.

According to a preferred embodiment, the MS is a dual-mode terminal, which is also able to connect not only to the local network BAN but also to a UMTS network via UTRAN base stations (node B).

FIG. 2 is a flowchart illustrating a method according to a preferred embodiment of the invention. System data of one or more mobile networks PLMN is stored 201 in a local network BAN, preferably in a gateway element BANGW. This data includes at least the identifiers (PLMN ID) of the PLMNs to which it is possible to connect from the local network BAN. The data also includes each network element identifier linked with the PLMN network identifier PLMN ID, such as an identifier of the authentication server AUTS according to a preferred embodiment. This identifier determines the network element that should be applied when using UMTS network services. The identifier thus identifies the UMTS network PLMN in the local network BAN. The identifier can also indicate some other UMTS network PLMN service or network element, such as a support node BSN. The data on the UMTS network PLMN can be determined 201 after the operators of the UMTS network PLMN and the local network BAN have agreed on the use of the PLMN authentication services, or the data can be transmitted from the network PLMN whenever needed. According to a preferred embodiment, PLMN identifiers PLMN ID are also determined 201 in the USIM connected to the MS to be used in network selection. A PLMN ID can consist for example of MCC (Mobile Country Code) and MNC (Mobile Network Code) sections of the IMSI. The PLMN identifiers are added to the USIM for example during the personalization thereof before the home operator HPLMN gives the USIM to the user. It is possible to determine 201, in a memory included in the UICC, a PLMN identifier list controlled by the operator, and a PLMN identifier list controlled by the user, which contain PLMN identifiers in order of priority. The PLMN identifiers can also be supplemented with an identifier indicating the access technology, such as UTRA or GSM. PLMN identifiers can also be determined in the memory M of the mobile station MS.

According to a preferred embodiment, a network element identifier linked with a PLMN identifier PLMN ID is a realm identifier, which is a part of an NAI (Network Access Identifier) that is of the form username@realm. A realm identifier is typically used in the AAA protocol to select a suitable AAA server (authentication server). A realm identifier is preferably a domain name, such as 'server_finland- .com', which can be used to determine the IP address of the server by means of the name service. Table 1 illustrates an imaginary table of correspondences combining PLMN identifiers PLMN ID and the network element realm identifiers.

TABLE 1

| PLMN ID | Realm |
| --- | --- |
| 1122 | Mobileoperator1_server1.com |
| 1234 | Mobileoperator2_server1.com |
| 4365 | Mobileoperator3_server5.fi |

One UMTS network identifier can naturally be provided with several network element identifiers, if alternative access is to be provided for example as backup in failure situations in the primary network element.

System information related to UMTS networks PLMN is determined in the local network BAN and transmitted 202 to the mobile station MS (information about networks, the authentication services and possibly other services of which can be utilized via the network BAN). The system information contains at least the PLMN identifiers PLMN ID of the UMTS networks PLMN, and the network element identifiers linked therewith, but other information is also possible. For example data on local services can be transmitted within the system information, and the mobile station can later utilize the data in order to obtain a service of the UMTS network PLMN. The system information can also comprise system information that is broadcast to mobile stations in cells of the UMTS network PLMN. This system information can be broadcast in the access points AP of the local network, and a roaming mobile station MS will therefore receive data on the available UMTS networks in advance. For example, the BANGW can implement broadcast of system information at certain intervals in the access points AP connected thereto. The system information can also be transmitted after the mobile station has set up a radio connection to the local network BAN and authentication must be carried out. Moreover, the MS can specifically ask for transmission of the system data for example by indicating that it wants to use the services of the UMTS network PLMN.

The mobile station performs 203 PLMN selection on the basis of a comparison of the received PLMN identifiers PLMN ID and the PLMN identifiers stored in the USIM (possibly also in the memory M) according to a preferred embodiment. According to a preferred embodiment, a network is selected as far as possible according to the 3GPP UMTS specifications, and the PLMN lists and the USIM can be utilized in the MS similarly as in a UMTS mobile station. According to the UMTS specifications, network selection can be either automatic or manual. In automatic network selection, the PLMN list stored in the USIM is checked in order of priority to see whether a PLMN identifier determined on the list is defined in the system information received from the local network BAN. When the mobile station finds a UMTS network PLMN the PLMN ID of which is stored in the USIM and received from the local network BAN, the MS selects this PLMN. If none of the PLMN identifiers stored in the USIM are found among the PLMN identifiers received from the local network BAN, the user can be given a possibility to select a PLMN identifier. Even several lists can be stored in the USIM, for example a PLMN list controlled by the user and a PLMN list controlled by the operator, and the identifiers to be checked first are preferably those of the user's PLMN list. If network selection is manual, the user is shown all the names, or usually operator identifiers of the networks, according to the PLMN identifiers received from the local network, from which the user can select the PLMN to be used. These networks are usually presented in a similar order as on the list defined in the USIM. The mobile station MS can also maintain a list of forbidden networks (forbidden PLMNs), which are not taken into account in the network selection 203.

After the MS has selected a PLMN, it can transmit 204 a request to the local network BAN for setting up a connection with a network element according to the network element identifier linked with the identifier of the selected PLMN. The local network BAN finds out the IP address of the network element from the network identifier, which is typically a domain name, by means of the name service or based on the data configured in the AAA network elements, and carries out the operations required to set up a connection 204 between the MS and the network element. If the selected network PLMN cannot be used for some reason, the network selection 203 can be carried out again as described above either automatically or manually, and a connection 204 can be set up to another UMTS network PLMN. The mobile station MS and the local network BAN may thus utilize the identifier of the network element to identify the UMTS network PLMN.

According to a preferred embodiment, the network element is the authentication server AUTS, and the PLMN is used at least for authentication and charging of the MS user on the basis of the subscriber data contained in the USIM and the HPLMN. The AUTS can utilize prior art UMTS signalling for requesting authentication data for the USIM, and it performs authentication and authorizes provision of services to the MS. Due to the authorization, the network element of the BAN implementing access control, such as the BANGW or the AP, can provide access to the Internet or to other parts of the WLAN. According to an embodiment, access can be provided to the services of the UTMS network PLMN that the mobile station can use after successful authentication.

An advantage of this embodiment is that the user can utilize the services of the roamed local networks BAN and UMTS networks (and GSM networks) by means of a conventional USIM (a UICC), which does not have to be modified due to the invention. The user can for example connect his UICC card to a mobile station given at the airport, with which the USIM can be authenticated, and the user can be charged via the home network HPLMN for the data transmission services he has used.

FIG. 3 illustrates this embodiment in the form of a signalling chart, where a roaming mobile station MS is provided, after the network selection, with access to the server AUTS that implements the authentication of the selected PLMN. The AUTS implements, by means of UMTS technology, the authentication of the MS and also provides a cipher key, which can be used in data transmission over a radio interface provided by the local network. If the MS does not utilize other UMTS services, this embodiment does not require the service node BSN illustrated in connection with FIG. 1a and the UMTS protocols required in the MS for communicating with the service node (however, the MS does need means for operating the USIM). What is needed from the UMTS network PLMN of FIG. 1a is the authentication server AUTS and access therefrom to the authentication centre HLR/AuC. According to a preferred embodiment, authentication between the MS and the AUTS is based on the EAP (Extensible Authentication Protocol) Authentication and Key Agreement (AKA), set forth in the IETF Internet draft "*EAP AKA Authentication*", October 2001, J. Arkko and H. Haverinen, determining the UMTS EAP utilizing the AKA mechanism.

A subscriber identification module USIM comprised in the MS provides the MS with an identity IMSI. A process of authenticating an MS is typically triggered when the MS starts setting up a connection to the local network BAN. Before a mobile station MS is allowed to set up a connection to a network other than the BAN, the authentication must be completed in an acceptable manner. As described above, the BANGW transmits 301 system information to the MS either as broadcast or in response to a request received from the MS. By means of this information, the MS performs 302 network selection according to the received PLMN identifiers and the PLMN identifiers stored in the USIM (PLMN selection). The BANGW, or according to another embodiment an access point AP that operates as an authenticator for the EAP, can transmit 303 to the MS a request for transmitting a user identity [EAP-Request/Identity].

The MS requests 304 (IMSI request) the USIM to transmit an IMSI, and the USIM returns 305 the IMSI. The MS transmits 306 a response [EAP-Response/Identity] preferably comprising a network identifier NAI. The response is routed via the IP network IPNW typically by means of the AAA protocol to the AUTS, which acts as an EAP authentication server. The NAI comprises the IMSI obtained from the USIM, and the realm identifier of the authentication server AUTS of the roamed network PLMN obtained as described above. The MS is thus provided with access via the local network BAN to the authentication server AUTS of the selected network PLMN by means of the identifier thereof, which is preferably a realm identifier. Therefore the MS is configured to replace, in the NAIs of the EAP messages, the realm identifier of its own default authentication server (in the HPLMN) with the realm identifier of the authentication server AUTS of the roamed network PLMN. The request 306 can be transmitted in an encrypted form to the BANGW for example by using the Diffie-Hellman algorithm. The MS can also transmit its own security code MS_RAND, which is typically a random number, in the request 306. By means of the security code MS_RAND, the MS can later ensure that the party providing a UMTS vector has access to the secret key K stored in the subscriber's HPLMN. However, it is not necessary to use a security code. It should be noted that unlike shown in FIG. 3, the MS can also transmit an EAP request 306 independently and without a specific request 303 after it has selected the network.

The authenticating network element (BANGW or AP) can decrypt the request 306, if required, and forward 307 the EAP request [EAP-Response/Identity] to the AUTS on the basis of the IP address obtained from the realm identifier of the NAI, or by utilizing conventional manners of the AAA protocol of controlling AAA traffic to a suitable AAA server by means of the realm identifier of the NAI by utilizing AAA configuration data. The authenticator can alternatively forward 307 the request to an AAA proxy server, which selects the correct server AUTS by means of the realm identifier of the NAI. The AUTS requests 308 (Auth. Data Req.) UMTS authentication vectors from the authentication centre HLR/AuC of the home network HPLMN (typically via the SGSN or the 3GMSC of the HPLMN). Authentication vectors are formed 309 (Calculate AV(s)) in the authentication centre AuC of the HPLMN in a manner defined in the UMTS specifications. One authentication vector comprises a random number RAND, an expected response XRES, a cipher key CK, an integrity key IK and an authentication token AUTN. The HLR/AuC transmits 310 the authentication vector to the AUTS (typically via other network elements of the UMTS core network) [Auth. Data Resp.]. It is also possible to transmit several authentication vectors from the HPLMN, so that the AUTS preferably selects one vector and stores the others for subsequent use.

The AUTS transmits 311 an authentication request [EAP-Req/USIM-Chall.] comprising one or more challenges RAND for the MS, and an authentication token AUTN (the AUTN is not used if GSM authentication is applied). This message can also comprise data related to charging. The message can also be encrypted by means of a security code MS_RAND. The BANGW forwards 312 the authentication request [EAP-Req/USIM-Chall.] to the MS.

In the MS, the challenge(s) RAND and the authentication token AUTN are supplied 313 to the USIM, which checks the authentication token. If the AUTN can be accepted, the USIM calculates 314 (Calculate RES(s)) an authentication response(s) RES similarly as in the authentication centre HLR/AuC, and forwards 315 the authentication response RES to the MS processing unit CPU (to an application entity managing tasks related to authentication and calculation of the cipher key CK).

The MS transmits 316 a response [EAP-Resp/USIM-Chall.] comprising at least the authentication response RES to the authenticator BANGW (or AP). The authenticator BANGW forwards 317 the response [EAP-Resp/USIM-Chall.] to the authentication server AUTS. The AUTS checks 318 (Check RES) the authentication response transmitted by the MS by comparing it to the expected authentication response XRES. If XRES and RES are identical, the MS (USIM) has been successfully authenticated.

The AUTS transmits 319 data about the successful authentication [EAP-Success] to the authenticator (BANGW or AP). This message preferably comprises a cipher key CK. The message 319 can also contain data (for example data on the quality of service QoS) about the services the MS is entitled to use. As a result of the message (319) received from the AUTS, the authenticator can allow data transmission services to be provided to the MS in the local network, for example in the case of a WLAN by allowing traffic via a controlled gate according to the IEEE 802.1x standard. For example, the MS can be provided with access to the Internet via the local network BAN. The authenticator forwards 320 data about successful authentication to the MS. The USIM can then calculate the cipher key CK and possibly the integrity key IK, and both the MS and the authenticator can transmit the cipher key CK to the ciphering means, which thereafter cipher traffic by means of the cipher keys according to the UMTS network. The MS can then be provided 321 (Usage of BAN Services) at least with data transmission services of the local network BAN. The charging of the MS can be initiated via the BANGW or the access point AP and the authentication server AUTS, which collects charging data from the BANGW or the AP by means of the AAA protocol, such as a RADIUS protocol, and generates charging data records CDR to be transmitted to the UMTS charging system.

If authentication was not successful, the message 319 contains information about the unsuccessful authentication, whereupon the MS will not preferably be provided with services in the local network BAN (nor preferably in the roamed UMTS network PLMN).

There are several alternative embodiments of the authentication procedure illustrated above. According to an embodiment, the data transmission between the MS and the authenticating base station AP can be implemented for example by means of the EAP for WLAN (EAPOL) determined in the IEEE 802.1x protocol. The RADIUS (Remote Authentication Dial In User Service) protocol, in turn, can be used between the authenticator (AP or BANGW) and the AUTS. In such a case there can be RADIUS proxy servers between the authenticator and the AUTS for transmitting RADIUS messages. As described above, the AUTS can communicate with the SGSN (or the 3GMSC) (either directly via the HPLMN or the PLMN) for example by means of a protocol over the TCP/IP, and the SGSN (3GMSC) in turn can communicate with the authentication centre HLR/AuC according to the Gr interface (the 3GMSC in turn communicates according to the MAP). The AUTS can also communicate directly with the AuC for example using the MAP.

It should be noted that unlike shown in FIG. 3, the PLMN identifier PLMN ID and the authentication server identifiers linked therewith can also be transmitted in an [EAP-Request/Identity] message (303). The MS thus performs network selection after it has received the EAP request and it responds with an NAI (step 306) containing the realm identifier according to the selected network. According to an embodiment, the AP of the local network operates as an EAP authenticator instead of the BANGW. It is also possible that the MS transmits a request [EAP-Response/Identity], to which the BANGW responds with system information.

When the roaming mobile station MS has selected the UMTS network PLMN to be used, and the authentication has been successfully completed as described above, the MS can use the UMTS network also for other purposes, as illustrated already in connection with FIG. 1a. One possibility is to set up a data transmission connection via the local network BAN to the UMTS network PLMN by means of the aforementioned service node BSN and the access it provides to the UMTS core network and particularly to the SGSN. The MS can transmit and receive data via a broadband connection provided by the local network BAN by utilizing, however, the PLMN coverage and the services specified in the subscription, which the user has also used via the WCDMA radio access of the UMTS network. This expands the availability of the UMTS services and provides easy access to the service also for mobile stations MS roaming outside the HPLMN.

If the system supports full mobility between different access networks, the MS can also start using the radio access provided by the radio network controllers and base stations (node B) of the selected UMTS network PLMN. Such a handover can be implemented for example automatically when none of the local network access points AP can provide sufficiently high data transmission quality.

Unlike in the embodiments shown in FIGS. 2 and 3, the PLMN identifiers PLMN ID and the authentication server identifiers linked therewith can also be determined in some other location than in the local network BAN, and they can be forwarded to the roaming MS from some other location. For example a UMTS network PLMN can store such data and broadcast it via UMTS base stations (nodes B) or possibly also via the local network BAN, which only has to forward the data to the MS.

It is obvious to those skilled in the art that as the technology develops the basic idea of the invention can be implemented in various ways. Thus, the invention and the embodiments thereof are not restricted to the examples described above, but they can vary within the scope of the claims.

The invention claimed is:

1. A method of arranging roaming in a telecommunications system comprising at least one wireless local network, at least one public land mobile network, and at least one wireless terminal equipment comprising means for setting up a data transmission connection at least with the local network, the method comprising:
   determining, in the telecommunications system, public land mobile network identifiers and network element identifiers linked with said public land mobile network identifiers,
   transmitting said public land mobile network identifiers and the network element identifiers linked therewith to the terminal equipment,
   selecting a public land mobile network by means of a comparison of said received public land mobile network identifiers and public land mobile network identifiers contained in the terminal equipment, and
   providing the terminal equipment with access via the local network to the network element determined by the network element identifier linked with the identifier of the selected public land mobile network, wherein data transmission between the local network and the public land mobile network is based on the Internet Protocol (IP), and data between the terminal equipment and the network element of the selected public land mobile network is transmitted by means of messages whose network access identifiers (NAI) comprise the domain name of the authentication server of the selected public land mobile network as a realm section.

2. The method of claim 1, wherein
   said public land mobile network identifiers and the network element identifiers linked with said public land mobile network identifiers are stored in the local network, and
   said public land mobile network identifiers and the network element identifiers linked with said public land mobile network identifiers are transmitted from the local network to the terminal equipment after the terminal equipment has set up a connection to the local network.

3. The method of claim 2, wherein
   said public land mobile network identifiers and the network element identifiers linked with said public land mobile network identifiers are transmitted from the local network in response to a request received from the terminal equipment.

4. The method of claim 1, wherein
   said network element of the public land mobile network is an authentication server, the method further comprising:
   carrying out the authentication of the terminal equipment by an authentication server defined by the network element identifier linked with the identifier of the selected public land mobile network, and
   allowing provision of data transmission services in the local network in response to successful authentication of the terminal equipment.

5. The method of claim 4, wherein
the public land mobile network is a UMTS network, and the terminal equipment comprises a universal subscriber identity module (USIM), which stores algorithms required for calculating an authentication response, and a subscriber identifier and a secret key, and
authentication is performed by the authentication server by comparing the authentication response (RES) calculated in the USIM of the terminal equipment to an expected authentication response (XRES) received from an authentication centre of the subscriber's home public land mobile network.

6. The method of claim 4, further comprising
forwarding charging data about the telecommunications services used by the terminal equipment to the charging system of the public land mobile network in response to successful authentication of the terminal equipment.

7. The method of claim 1, wherein
said network element of the public land mobile network is an authentication server, the method further comprising:
performing authentication of the terminal equipment by an authentication server defined by the network element identifier linked with the identifier of the selected public land mobile network, and
allowing provision of data transmission services in the selected public land mobile network in response to successful authentication of the terminal equipment.

8. The method of claim 7, wherein
the public land mobile network is a UMTS network, and the terminal equipment comprises a universal subscriber identity module (USIM), which stores algorithms required for calculating an authentication response, and a subscriber identifier and a secret key, and
authentication is performed by the authentication server by comparing the authentication response (RES) calculated in the USIM of the terminal equipment to an expected authentication response (XRES) received from an authentication centre of the subscriber's home public land mobile network.

9. The method of claim 7, further comprising
forwarding charging data about the telecommunications services used by the terminal equipment to the charging system of the public land mobile network in response to successful authentication of the terminal equipment.

10. The method of claim 1, wherein
at least one list comprising the public land mobile network identifiers is stored in order of priority in the subscriber identity module contained in the terminal equipment,
the identifiers on the list are compared in the terminal equipment to the public land mobile network identifiers received from the local network in order of priority, and
a public land mobile network the identifier of which is also found from the public land mobile network identifiers received from the local network is selected.

11. A telecommunications system comprising at least one local network, at least one public land mobile network, and at least one wireless terminal equipment configured to set up a data transmission connection at least with the local network, wherein
public land mobile network identifiers and network element identifiers linked with said public land mobile network identifiers are configured to be determined in the telecommunications system,
said public land mobile network identifiers and the network element identifiers linked therewith are configured to be transmitted to the terminal equipment in the telecommunications system,
the terminal equipment is configured to select a public land mobile network by means of a comparison of said received public land mobile network identifiers and the public land mobile network identifiers contained in the terminal equipment, and
the terminal equipment is configured to set up a connection via the local network to the network element determined by the network element identifier linked with the identifier of the public land mobile network selected by the terminal equipment, wherein data transmission between the local network and the public land mobile network is based on the Internet Protocol (IP), and data between the terminal equipment and the network element of the selected public land mobile network is configured to be transmitted by means of messages whose network access identifiers (NAI) comprise the domain name of the authentication server of the selected public land mobile network as a realm section.

12. The telecommunications system of claim 11, wherein
the local network is configured to store said public land mobile network identifiers and the network element identifiers linked with said public land mobile network identifiers, and
the local network is configured to transmit said public land mobile network identifiers and the network element identifiers linked with said public land mobile network identifiers to the terminal equipment after the equipment has set up a connection to the local network.

13. The telecommunications system of claim 12, wherein
the terminal equipment is configured to select a network by means of the public land mobile network identifiers contained in the subscriber identification module located in the terminal equipment, and
said network element is an authentication server configured to perform authentication of the terminal equipment by comparing an authentication response calculated by the subscriber identification module of the terminal equipment to an authentication response calculated in the public land mobile network.

14. The telecommunications system of claim 11, wherein
the terminal equipment is configured to select a network by means of the public land mobile network identifiers contained in the subscriber identification module located in the terminal equipment, and
said network element is an authentication server configured to perform authentication of the terminal equipment by comparing an authentication response calculated by the subscriber identification module of the terminal equipment to an authentication response calculated in the public land mobile network.

15. A wireless terminal equipment configured to set up a data transmission connection at least with a wireless local network, wherein
the terminal equipment is configured to receive public land mobile network identifiers and network element identifiers linked therewith,
the terminal equipment is configured to select a public land mobile network on the basis of a comparison of said received public land mobile network identifiers and the public land mobile network identifiers contained in the terminal equipment, the terminal equipment is configured to set up a connection via the local network to a network element defined by the network element identifier linked with the identifier of the public land mobile network selected by the terminal equipment, wherein the terminal equipment is configured to transmit a message for Internet Protocol (IP)-based data transmission whose network access identifier (NAI) comprises the domain name of an authentication server of the selected public land mobile network as a realm section.

16. The terminal equipment of claim 15, wherein the terminal equipment comprises a subscriber identification module containing subscriber data required for using services of the public land mobile network, the terminal equipment is configured to select a network on the basis of the public land mobile network identifiers contained in the subscriber identification module of the terminal equipment, the subscriber identification module is configured to form an authentication response used in the authentication, and the terminal equipment is configured to transmit the authentication response to the network element.

17. A computer program product operable on a processor of a mobile station, the computer program product comprising a computer program code portion for causing the mobile station to select a public land mobile network on the basis of a comparison of received public land mobile network identifiers and public land mobile network identifiers contained in the mobile station, and a computer program code portion for causing the mobile station to set up a connection via the local network to a network element defined by the network element identifier linked with the identifier of the selected public land mobile network, wherein the computer program product comprises a computer program code portion for causing the mobile station to transmit a message for Internet Protocol (IP)-based data transmission whose network access identifier (NAI) comprises the domain name of an authentication server of the selected public land mobile network as a realm section.

18. A method for a wireless terminal equipment configured to set up a data transmission connection at least with a wireless local network in a system further comprising at least one public land mobile network, the method comprising:

receiving public land mobile network identifiers and network element identifiers linked therewith, selecting a public land mobile network by means of a comparison of said received public land mobile network identifiers and public land mobile network identifiers contained in the terminal equipment, and setting up an access via the local network to the network element determined by the network element identifier linked with the identifier of the selected public land mobile network, wherein the terminal equipment is configured to transmit a message for Internet Protocol (IP)-based data transmission whose network access identifier (NAI) comprises the domain name of an authentication server of the selected public land mobile network as a realm section.

19. An access controller for a wireless local network, wherein the access controller is configured to operate as a gateway in data transmission between an access point of the local area network and a public land mobile network;

the access controller is configured to determine public land mobile network identifiers and network element identifiers linked with said public land mobile network identifiers, and the access controller is configured to transmit said public land mobile network identifiers and the network element identifiers linked therewith to the terminal equipment, wherein data transmission between the local network and the public land mobile network is based on the Internet Protocol (IP) and the access controller is configured to provide data transmission between the terminal equipment and the network element of the selected public land mobile network on the basis of messages whose network access identifiers (NAI) comprise the domain name of an authentication server of the selected public land mobile network as a realm section.

20. An access controller of claim 19, wherein the access controller is configured to operate as an authenticator for an EAP (Extensible Authentication Protocol) applied for the terminal equipment.

21. An access controller of claim 20, wherein the access controller is configured to transmit an EAP message to an authentication server in a public land mobile network on the basis of an EAP request or response message from the terminal equipment, the access controller is configured to forward an authentication request from the authentication server to the terminal equipment, the access controller is configured to forward an authentication response from the terminal equipment to the authentication server, the access controller is configured to receive information on success of the authentication from the authentication server, and the access controller is configured to allow data transmission services to be provided to the terminal equipment in the wireless local network in response to information from the authentication server indicating successful authentication.

22. A method for providing system information for roaming in a telecommunications system comprising at least one wireless local network, at least one public land mobile network, and at least one wireless terminal equipment comprising means for setting up a data transmission connection at least with the local network, the method comprising:

determining, in access controller for the wireless local network, public land mobile network identifiers and network element identifiers linked with said public land mobile network identifiers, and transmitting said public land mobile network identifiers and the network element identifiers linked therewith to the terminal equipment, wherein data transmission between the local network and the public land mobile network is based on the Internet Protocol (IP) and the access controller is configured to provide data transmission between the terminal equipment and the network element of the selected public land mobile network on the basis of messages whose network access identifiers (NAI) comprise the domain name of an authentication server of the selected public land mobile network as a realm section.

23. A method of claim 22, wherein the access controller operates as an authenticator for an EAP (Extensible Authentication Protocol) applied for the terminal equipment.

* * * * *